(12) United States Patent
Tsuruta

(10) Patent No.: US 6,786,261 B2
(45) Date of Patent: Sep. 7, 2004

(54) PNEUMATIC TIRES

(75) Inventor: Makoto Tsuruta, Akishima (JP)

(73) Assignee: Bridgestone Corporation, Tokyo (JP)

(*) Notice: Subject to any disclaimer, the term of this patent is extended or adjusted under 35 U.S.C. 154(b) by 1 day.

(21) Appl. No.: 09/777,661

(22) Filed: Feb. 7, 2001

(65) Prior Publication Data
US 2001/0017179 A1 Aug. 30, 2001

(30) Foreign Application Priority Data
Feb. 7, 2000 (JP) ......................... 2000-029056

(51) Int. Cl.[7] .............................. B60C 9/00; B60C 9/18; B60C 9/22; B60C 9/28
(52) U.S. Cl. .................. 152/532; 152/526; 152/531; 152/535; 152/537; 152/538
(58) Field of Search ................. 152/526, 531, 152/532, 533, 535, 536, 537, 538

(56) References Cited

U.S. PATENT DOCUMENTS

| | | | |
|---|---|---|---|
| 3,392,773 A | | 7/1968 | Warren et al. |
| 3,406,733 A | * | 10/1968 | Boileau .................. 152/542 |
| 3,598,165 A | * | 8/1971 | Hanus ...................... 152/1 |
| 4,044,811 A | * | 8/1977 | Dudek et al. ............. 152/452 |
| 4,262,726 A | * | 4/1981 | Welter ..................... 152/531 |
| 4,702,293 A | * | 10/1987 | Iwata et al. ............... 152/454 |
| 4,887,655 A | * | 12/1989 | Imai et al. ................. 152/531 |
| 5,042,545 A | * | 8/1991 | Kabe et al. ............... 152/454 |
| 5,879,483 A | * | 3/1999 | Gerresheim et al. ... 152/209.15 |
| 5,996,662 A | * | 12/1999 | Cluzel ...................... 152/531 |

FOREIGN PATENT DOCUMENTS

| | | |
|---|---|---|
| EP | 0 712 738 A | 5/1996 |
| FR | 2 566 334 A | 12/1985 |
| JP | 63-235103 | * 9/1988 |
| JP | 2208101 | 8/1990 |
| JP | 3-104706 | * 5/1991 |
| JP | 2000-16019 | * 1/2000 |

OTHER PUBLICATIONS

Clark, Mechanics of Pneumatic Tires, p. 881, Aug. 1981.*
Patent Abstracts of Japan, vol. 016, No. 498 (M–1325) (Oct. 15, 1992) as it relates to JP 04–183605 issued Jun. 30, 1992 to Yokohama Rubber Co.

* cited by examiner

Primary Examiner—Jeff H. Aftergut
Assistant Examiner—Justin R Fischer
(74) Attorney, Agent, or Firm—Sughrue Mion, PLLC

(57) ABSTRACT

A pneumatic tire comprises a carcass, a belt comprised of at least two belt layers, a belt reinforcement arranged between the carcass and the belt and comprised of at least one belt reinforcing layer, and a tread rubber, in which a widthwise outer end of a widest-width belt reinforcing layer is arranged outward from a widthwise outer end of a widest-width belt layer among the belt layers, and a restraining rubber having a width of not less than 4 mm and a JIS hardness not less than a JIS hardness of a coating rubber for the widest-width belt reinforcing layer is arranged outward from the widthwise outer end of the widest-width belt reinforcing layer.

12 Claims, 5 Drawing Sheets

PNEUMATIC TIRES

BACKGROUND OF THE INVENTION

1. Field of the Invention

This invention relates to a pneumatic tire comprising a belt and a belt reinforcement embedded with reinforcing elements extending in a circumferential direction.

2. Description of Related Art

Heretofore, there has been known a pneumatic tire comprising a belt reinforcement for reinforcing a belt as disclosed, for example, in JP-A-2-208101. Such a tire comprises a carcass toroidally extending between a pair of bead portions, a belt arranged on an outside of the carcass in a radial direction and comprised of at least two belt layers embedding many reinforcing cords inclined with respect to an equatorial plane of the tire, the cords of which layers being crossed with each other, a belt reinforcement arranged on an inside of the belt in the radial direction and having a width narrower than that of the belt and comprised of at least one belt reinforcing layer embedded with reinforcing elements extending in a circumferential direction, and a tread rubber arranged on outsides of the belt and the belt reinforcement in the radial direction.

However, if it is intended to be low aspect ratio trend of such a pneumatic tire in accordance with the higher speed requirement and lowering of floor in recent vehicles, since the restraint by the belt reinforcement is insufficient, a tread portion, particularly a shoulder portion largely grows in the radial direction in the inflation under an internal pressure, and hence it is apt to generate separation failure between the belt layers at their widthwise outer ends by such a size growth of the tread portion.

For this end, it is recently examined to enhance the restraint to the tread portion by making the width of the belt reinforcement wider than the width of the belt to thereby uniformize the size growth of the tread portion and control the separation failure between the belt layers. However, when the width of the belt reinforcement is made wider than the width of the belt, it has been confirmed that separation failure is generated at the belt reinforcement, particularly in a widthwise outer end of a widest-width belt reinforcing layer.

SUMMARY OF THE INVENTION

The inventor has made various studies on such a separation failure at the end of the belt reinforcement and obtained the following knowledge. Firstly, the tread portion is subjected to compression deformation in the radial direction in a ground contact region of the tread portion, particularly a portion just under a load or in neighborhood thereof, and such a compression deformation becomes fairly large in an end part of the tread portion located in a position corresponding to a widthwise outer end of the belt reinforcement, particularly the widest-width belt reinforcing layer in case of a low-section profile pneumatic tire. Secondly, when the belt and the belt reinforcement are deformed so as to narrow their widths by the above compression deformation, a coating rubber surrounding the reinforcing element located at the widthwise outermost end of the widest-width belt reinforcing layer is subjected to deformation in the widthwise direction, and if a JIS hardness of a lateral rubber located adjacent to such a coating rubber is smaller than a JIS hardness of the coating rubber, the lateral rubber hardly controls the deformation of the coating rubber in the widthwise direction and hence a large strain is caused in the coating rubber to facilitate the occurrence of separation failure.

The invention is based on the above knowledge and lies in a pneumatic tire comprising a carcass toroidally extending between a pair of bead portions, a belt arranged on an outside of the carcass in a radial direction and comprised of at least two belt layers containing many reinforcing cords inclined with respect to an equatorial plane of the tire, the cords of which layers being crossed with each other, a belt reinforcement arranged on an inside of the belt in the radial direction and having a width narrower than that of the belt and comprised of at least one belt reinforcing layer embedded with reinforcing elements extending in a circumferential direction, and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and a restraining rubber having a width of not less than 4 mm and a JIS hardness not less than a JIS hardness of a coating rubber for the widest-width belt reinforcing layer is arranged outward from the widthwise outer end of the widest-width belt reinforcing layer.

When the restraining rubber having a JIS hardness not less than that of the coating rubber for the widest-width belt reinforcing layer is arranged outward from the widthwise outer end of the widest-width belt reinforcing layer as mentioned above, the hardly deformable restraining rubber restrains the coating rubber surrounding the reinforcing element located at the widthwise outermost end of the widest-width belt reinforcing layer to control the deformation of the coating rubber in the widthwise direction. Thus, strain in the coating rubber is decreased to control the separation failure. Moreover, when the width of the restraining rubber is less than 4 mm, the above restraining force becomes too weak and hence the effect of controlling the separation failure can not be developed.

In a preferable embodiment of the invention, the JIS hardness of the restraining rubber is 65–85 degrees. Thus, the separation failure at the widthwise outer end of the widest-width belt reinforcing layer can effectively be controlled while preventing the occurrence of separation failure in the carcass.

In another preferable embodiment of the invention, a gauge of the restraining rubber at a boundary between the widthwise outer end of the widest-width belt reinforcing layer and the restraining rubber is made not less than a thickness at the widthwise outer end of the belt reinforcement. Thus, the occurrence of separation failure can effectively be controlled in any position at the widthwise outer end of the widest-width belt reinforcing layer.

In the other preferable embodiment of the invention, the restraining rubber is integrally united with the coating rubber for the belt reinforcing layer. Thus, the restraining rubber is arranged together with the arrangement of the belt reinforcing layer, so that the working operation becomes easy.

In a further preferable embodiment of the invention, the restraining rubber is extended inward in the widthwise direction so as to cover the widthwise outer end part of the belt reinforcement from the outside thereof in the radial direction. Thus, strain is largely decreased at the widthwise outer end of the widest-width belt reinforcing layer, whereby the separation failure can be controlled more effectively.

In a still further preferable embodiment of the invention, when the JIS hardness of the restraining rubber is not less than 65 degrees but not more than 80 degrees, the restraining rubber is passed over an outside of the widthwise outer end part of the belt reinforcement in the radial direction and extended inward in the widthwise direction up to a zone between the belt reinforcement and a widthwise outer end part of a widest-width belt layer. Thus, separation failure at the widthwise outer end of the widest-width belt reinforcing layer and separation failure between the belt reinforcement and the belt can simultaneously controlled.

In a yet further preferable embodiment of the invention, the restraining rubber is extended inward in the widthwise direction so as to envelop the widthwise outer end part of the belt reinforcement from its outside and inside in the radial direction. Thus, strain at the widthwise outer end of the widest-width belt reinforcing layer is surely decreased, whereby the separation failure can strongly be controlled.

In another preferable embodiment of the invention, the restrained rubber is comprised of two or more radially laminated rubber layers having different JIS hardnesses, and a JIS hardness of a rubber layer located near to the carcass among the rubber layers becomes smaller than that of the remaining rubber layer. Thus, strain in a coating rubber for the carcass adjacent to the restraining rubber can be decreased.

In the other preferable embodiment of the invention, when the JIS hardness of the restraining rubber exceeds 85 degrees, a rubber layer having a JIS hardness smaller than that of a coating rubber for the carcass is interposed between the carcass and the restraining rubber. Thus, the occurrence of separation failure in the coating rubber for the carcass can be prevented.

BRIEF DESCRIPTION OF THE DRAWINGS

The invention will be described with reference to the accompanying drawings, wherein.

DETAILED DESCRIPTION OF THE INVENTION

Figure 1:
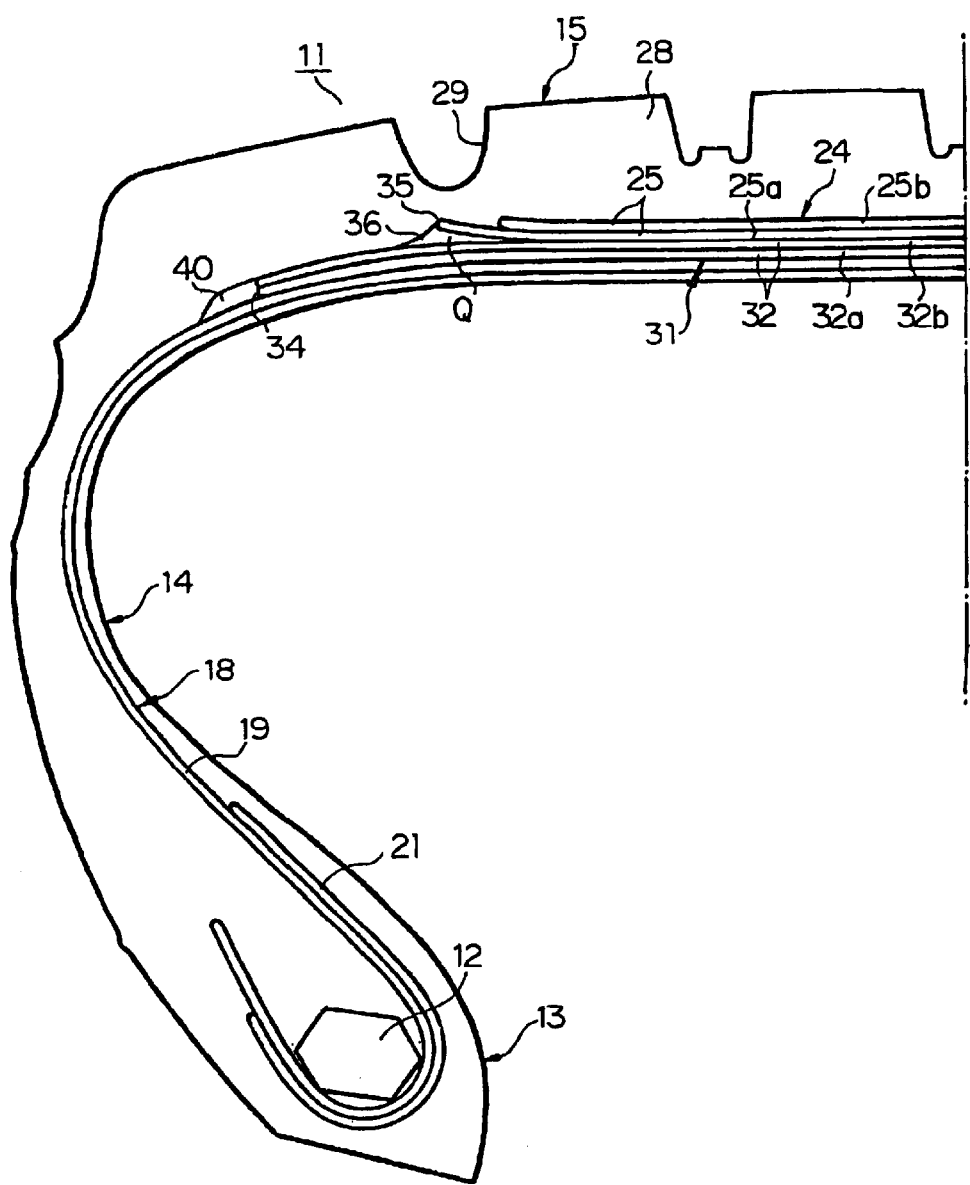
FIG. 1 is a diagrammatically left-half section view of a first embodiment of the pneumatic tire according to the invention.
Figure 2:
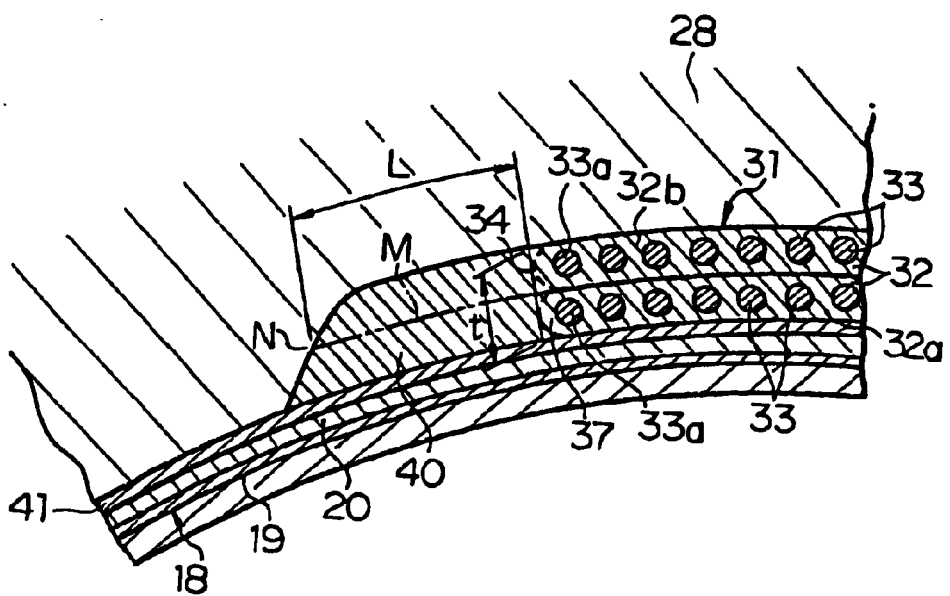
FIG. 2 is a diagrammatically partial enlarged section view illustrating a zone in the neighborhood of a restraining rubber in FIG. 1.

In FIGS. 1 and 2, numeral 11 is a low-section profile heavy duty pneumatic radial tire having an aspect ratio of not more than 0.70. This tire 11 comprises a pair of bead portions 13 each embedding a bead core 12 therein, a sidewall portion 14 extending outward from the respective bead portion 13 substantially in a radial direction, and a tread portion 15 of substantially a cylindrical shape connecting radially outer ends of the sidewall portions 14 to each other.

And also, the tire 11 comprises a carcass 18 toroidally extending between the bead cores 12 to reinforce the sidewall portion 14 and the tread portion 15, wherein each end portion of the carcass 18 is wound around the bead core 12 from an inside of the tire toward an outside thereof in the radial direction. The carcass 18 is comprised of at least one carcass ply 19, one carcass ply in the illustrated embodiment. In the interior of the carcass ply 19 are embedded many inextensible cords 20 such as steel cords each arranged substantially in the radial direction. Furthermore, a chafer 21 reinforced with, for example, steel cords is arranged around the carcass 18 in the bead portion 13.

Numeral 24 is a belt arranged on an outside of the carcass 18 in the radial direction. The belt 24 is comprised of at least two belt layers 25 (two belt layers in the illustrated embodiment) piled one upon the other, and many inextensible reinforcing cords such as steel cords, aramid fiber cords and the like are embedded in the inside of each belt layer 25. In this case, the reinforcing cords embedded in the belt layer 25 are inclined at a cord angle of 45–70° with respect to the circumferential direction, and the inclining directions of the cords in at least two belt layers 25 are opposite to each other.

Among the belt layers 25, a width of an inner belt layer 25a located inside in the radial direction is wider than that of an outer belt layer 25b located outside in the radial direction. In the illustrated embodiment, therefore, the inner belt layer 25a is a widest-width belt layer.

Numeral 28 is a tread rubber arranged on outsides of the belt 24 and the following belt reinforcement 31 in the radial direction, wherein a plurality of main grooves 29 extending in the circumferential direction and a plurality of lateral grooves (not shown) crossing with these main grooves 29 are formed on the outer surface of the tread rubber 28.

Numeral 31 is a belt reinforcement arranged on the inside of the belt 24 and the outside of the carcass 18 in the radial direction, i.e. sandwiched between the belt 24 and the carcass 18 so as to overlap with the belt 24. The belt reinforcement 31 is comprised of at least one belt reinforcing layer 32, two laminated belt reinforcing layers 32 in the illustrated embodiment. In the inside of each belt reinforcing layer 32 are embedded reinforcing elements 33 of an inextensible material such as steel, aramid fiber or the like extending substantially in the circumferential direction. The reinforcing element 33 is a cord (twisted wire) or a monofilament. At the radial section of the belt reinforcing layer 32 are observed many reinforcing elements.

In the embodiments of the invention, the reinforcing elements 33 are arranged in a plane parallel to front and rear faces of the belt reinforcing layer 32 in a wavy or zigzag form such as square wave, triangular wave, sign wave or the like and at the same phase, but they may be arranged so as to extend straightforward in parallel to each other.

The belt reinforcement 31 is comprised of an inner belt reinforcing layer 32a located inside in the radial direction and an outer belt reinforcing layer 32b located outside in the radial direction adjacent to the widest-width belt layer 25a, which have equal width. As a result, these inner and outer belt reinforcing layers 32a, 32b are widest-width belt reinforcing layers, respectively. And also, each of the belt reinforcing layers may be formed by helically winding a ribbon-shaped rubberized body containing plural reinforcing elements 33 arranged side by side on the outside of the carcass 18 many times.

In the invention, widthwise outer ends 34 of the inner and outer belt reinforcing layers 32a, 32b or the widest-width belt reinforcing layer are located outward from a widthwise outer end 35 of the widest-width inner belt layer 25a in the widthwise direction. Thus, the tread portion 15 is strongly restrained by the belt reinforcement 31 to uniformize the size growth of the tread portion 15 and control separation failure between the layers of the belt 24. Moreover, numeral 36 is a cushion rubber interposed between the belt reinforcement 31 and the widthwise outer end part of the widest-width inner belt layer 25a.

However, when the widthwise outer ends 34 of the widest-width inner and outer belt reinforcing layers 32a, 32b are located outward from the widthwise outer end 35 of the widest-width inner belt layer 25a in the widthwise direction, a coating rubber 37 surrounding reinforcing elements 33a located at widthwise outermost end parts of the widest-width inner and outer belt reinforcing layers 32a, 32b is subjected to a widthwise deformation by the compression deformation of the tread portion 15 inward in the radial direction, whereby there may be caused separation failure.

In the illustrated embodiment of the invention, therefore, a restraining rubber 40 having a JIS hardness not less than that of the coating rubber 37 for the widest-width belt reinforcing layers 32a, 32b is arranged outward from the widthwise outer ends 34 of the widest-width belt reinforcing layers 32a, 32b in the widthwise direction. The arrangement of such a hardly deformable restraining rubber 40 restrains the coating rubber 37 surrounding the outermost reinforcing elements 33a in the widest-width belt reinforcing layers 32a, 32b to control the deformation of the coating rubber 37 in the widthwise direction, whereby strain in the coating rubber 37 is decreased to control the separation failure.

In this case, the JIS hardness of the restraining rubber 40 is favorable to be not less than 65 degrees but not more than 85 degrees. When the JIS hardness is less than 65 degrees, the deformation of the coating rubber 37 surrounding the outermost reinforcing elements 33a can not sufficiently be restrained and the effect of controlling the separation failure is insufficient, while when it exceeds 85 degrees, a large strain is generated in a coating rubber 41 for the carcass 18 (carcass ply 19) to cause separation failure in the coating rubber 41. Moreover, the term "JIS hardness" used herein means a hardness of rubber measured at a temperature of 30° C. by using a hardness testing machine of type-A durometer according to JIS K6253-1993.

In the illustrated embodiment, the restraining rubber 40 is integrally united with the coating rubber 37 for the belt reinforcing layers 32a, 32b, i.e. it is formed by extending the coating rubber 37 outward in the widthwise direction. As a result, a clear boundary is not existent between the coating rubber 37 surrounding the outermost reinforcing element 33a and the restraining rubber 40, but a hypothetical boundary can be considered to be existent as shown by dotted lines in FIG. 2. In case of the integrally united body as mentioned above, the kind of rubber is the same between the restraining rubber 40 and the coating rubber 37, so that the JIS hardness is naturally the same therebetween.

In order to integrally unite the restraining rubber 40 with the coating rubber 37 surrounding the outermost reinforcing element 33a, it is enough to form a fin portion for the coating rubber on a part of the ribbon-shaped body so as to protrude from a side end of the ribbon-shaped body during the production of such a ribbon-shaped body. Then, when the restraining rubber 40 is integrally united with the coating rubber 37 surrounding the outermost reinforcing element 33a as mentioned above, the restraining rubber 40 may be simultaneously arranged outside the carcass 18 in the formation of the belt reinforcement 31 by the winding of the ribbon-shaped body, whereby the working operation is made easy.

The restraining rubber 40 must have a width L of not less than 4 mm. When the width L is less than 4 mm, the restraining rubber 40 hardly restrains the deformation of the coating rubber 37 surrounding the outermost reinforcing element 33a and hence the separation failure is easily caused. However, when the width L exceeds 60 mm, the restraining rubber 60 is wider than a tread width in the tire building and there is caused an accident of entering air into the tire, so that the width L is favorable to be not more than 60 mm.

Moreover, the width L of the restraining rubber 40 means a length extending from the widthwise outer end of the coating rubber 37 surrounding the outermost reinforcing element 33a to an intersect N between a curved line M passing through a center of the belt reinforcement 31 in its thickness direction and in parallel to the carcass 18 and a surface of the widthwise outer end of the restraining rubber 40 along the curved line M.

Further, a gauge t of the restraining rubber 40 at a boundary between the widthwise outer end 34 of the widest-width belt reinforcing layer 32a, 32b and the restraining rubber 40 is favorable to be not less than a thickness of the belt reinforcement 31 at its widthwise outer end. Although the separation failure is caused from any positions in the widthwise outer end 34 of the belt reinforcing layers 32a, 32b, the separation in any positions can effectively be controlled when the gauge t is defined as mentioned above.

Figure 3:
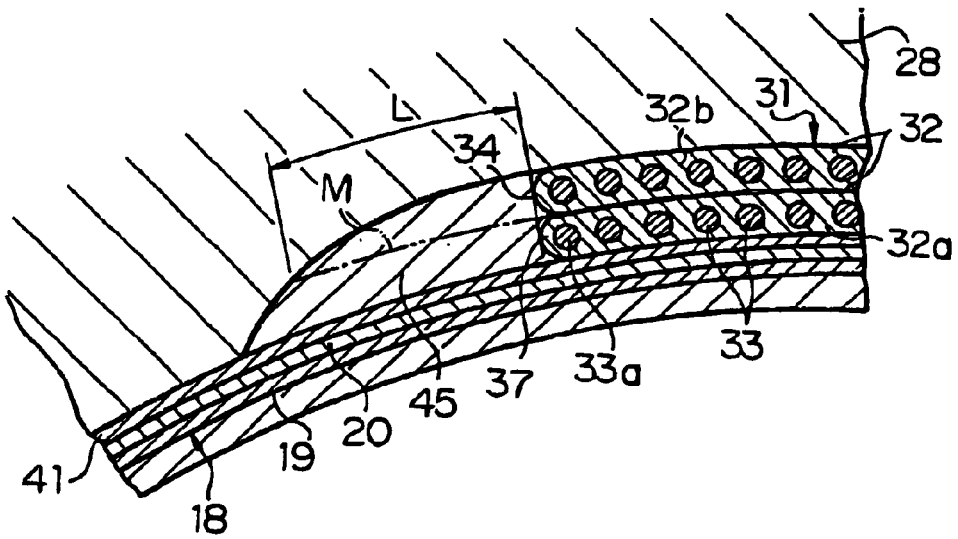
FIG. 3 is a diagrammatically partial enlarged section view illustrating a zone in the neighborhood of a restraining rubber in a second embodiment of the pneumatic tire according to the invention.

In FIG. 3 is shown a second embodiment of the invention. In this embodiment, a restraining rubber 45 is made of a rubber material different from the coating rubber 37 for the belt reinforcing layer 32. That is, rubber satisfying requirements as the restraining rubber 45 can be used, whereby the separation failure can effectively be controlled. Moreover, the other structure and function are the same as in the first embodiment.

Figure 4:
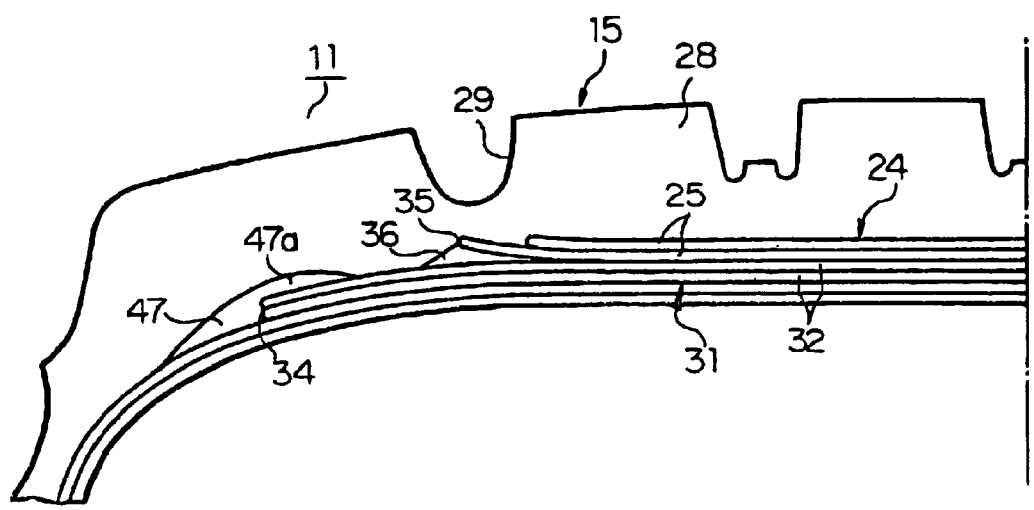
FIG. 4 is a diagrammatically left-half section view of a third embodiment of the pneumatic tire according to the invention.

FIG. 4 shows a third embodiment of the invention. In this embodiment, an outside part of a restraining rubber 47 in the radial direction (outer part in thickness direction) is extended inward in the widthwise direction so as to cover the widthwise outer end part of the belt reinforcement 31 from its outside with an extended zone 47a in the radial direction.

Thus, the restraining rubber 47 (extended zone 47a) locates even on the outside of the coating rubber 37 surrounding the outermost reinforcing elements 33a in the radial direction, so that the restraint to the coating rubber becomes strong and hence strain at the widthwise outer end 34 of the widest-width belt reinforcing layer 32a, 32b is largely decreased and the separation failure is further controlled. Moreover, the other structure and function are the same as in the first embodiment.

Figure 5:
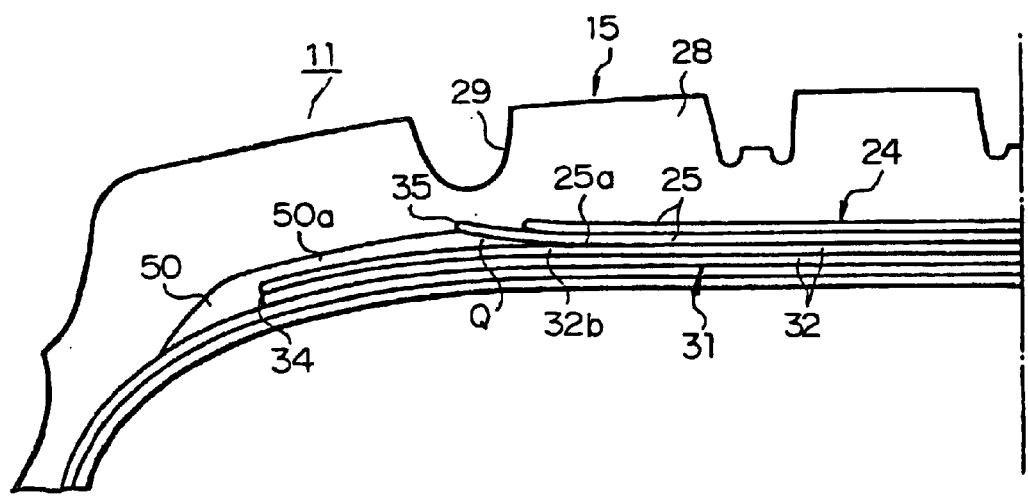
FIG. 5 is a diagrammatically left-half section view of a fourth embodiment of the pneumatic tire according to the invention.

FIG. 5 shows a fourth embodiment of the invention. In this embodiment, an outside part of a restraining rubber 50 in the radial direction (outer part in thickness direction) is passed over an outside of the widthwise outer end part of the belt reinforcement 31 in the radial direction and extended inward in the widthwise direction up to a zone Q between the belt reinforcement 31, particularly the outer belt reinforcing layer 32b and a widthwise outer end part of a widest-width belt layer 25a.

In this case, the restraint to the coating rubber 37 is firstly made stronger likewise the above third embodiment.

Secondly, there is feared the occurrence of separation failure due to the occurrence of a large shearing strain in the zone Q between the widthwise outer end part of the widest-width belt layer 25a and the belt reinforcement 31 (outer belt reinforcing layer 32b) because there is a difference in circumferential elongation between both the layers 25a and 32b. However, such a shearing strain can effectively be mitigated when the extended zone 50a of the restraining rubber 50 is extended up to the zone Q and interposed between the layers to thicken a rubber gauge at the zone Q. Thus, when the restraining rubber has a shape as mentioned above, separation failures at the above two positions can simultaneously be controlled by the single restraining rubber 50.

In this case, the JIS hardness of the restraining rubber 50 should be not less than 65 degrees but not more than 80 degrees. When the JIS hardness of the restraining rubber 50 exceeds 80 degrees, strain concentrates in a coating rubber for the inner belt layer 25a having a JIS hardness smaller than that of the restraining rubber 50 and hence there is feared the occurrence of separation failure in such a coating rubber. While, the reason why the JIS hardness is limited to not less than 65 degrees is the same as previously mentioned. Moreover, the other structure and function are the same as in the first embodiment.

Figure 6:
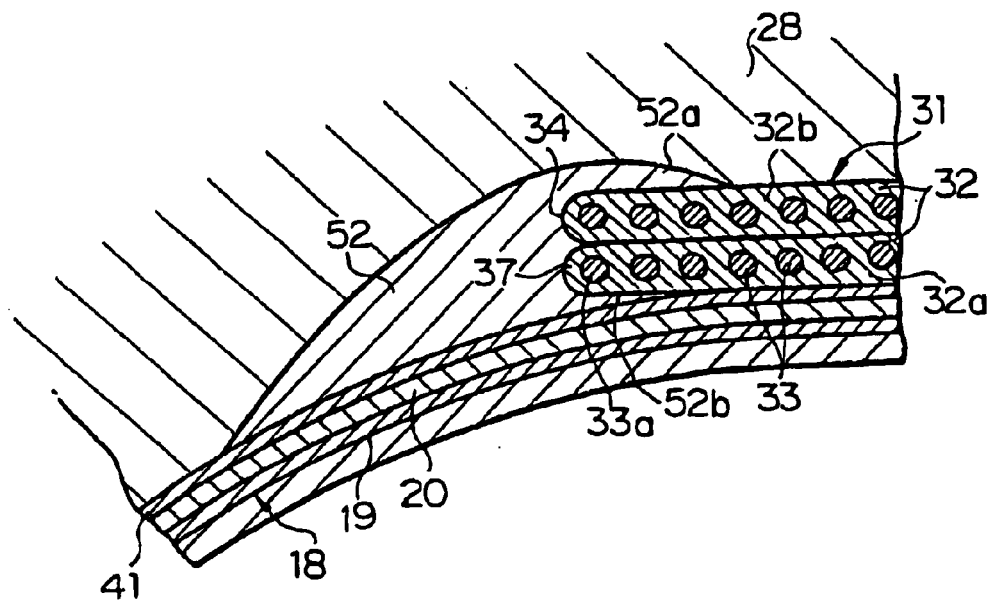
FIG. 6 is a diagrammatically partial enlarged section view illustrating a zone in the neighborhood of a restraining rubber in a fifth embodiment of the pneumatic tire according to the invention.

FIG. 6 shows a fifth embodiment of the invention. In this embodiment, an outside part of a restraining rubber 52 in the radial direction (outer part in thickness direction) and an inside part thereof in the radial direction (inner part in thickness direction) are extended inward in the widthwise direction together so as to envelop the widthwise outer end part of the belt reinforcement 31 from its outside and inside in the radial direction with an outer extended zone 52a and an inner extended zone 52b. That is, the widthwise outer end part of the belt reinforcement 31 is enveloped with the restraining rubber 52 from the outside and inside in the radial direction.

Thus, the restraining rubber 52 (extended zones 52a, 52b) locates on the outside and inside of the coating rubber 37 surrounding the outermost reinforcing elements 33a in the radial direction, so that the restraint to the coating rubber 37 becomes more strong and hence strain at the widthwise outer end 34 of the widest-width belt reinforcing layer 32a, 32b is more largely decreased and the separation failure is strongly controlled. Moreover, the other structure and function are the same as in the first embodiment.

Figure 7:
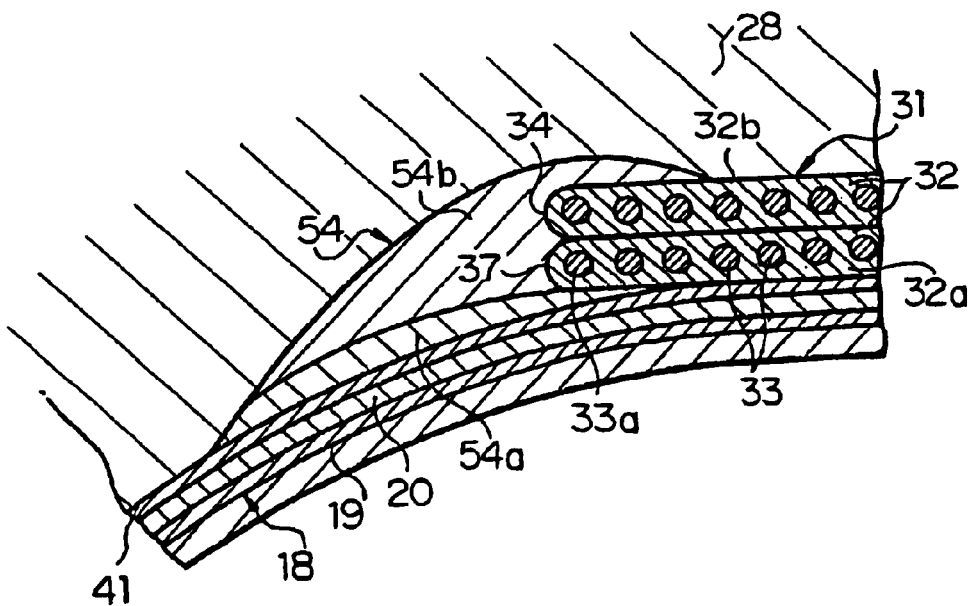
FIG. 7 is a diagrammatically partial enlarged section view illustrating a zone in the neighborhood of a restraining rubber in a sixth embodiment of the pneumatic tire according to the invention.

FIG. 7 shows a sixth embodiment of the invention. In this embodiment, a restrained rubber 54 is comprised of two or more radially laminated rubber layers having different JIS hardnesses (two rubber layers in the illustrated embodiment), i.e. an inner rubber layer 54a and an outer rubber layer 54b, wherein a JIS hardness of a rubber layer located near to the carcass 18 among the rubber layers (inside in the radial direction) is made smaller than that of the remaining rubber layer. In the illustrated embodiment, the JIS hardness of the inner rubber layer 54a is made smaller than that of the outer rubber layer 54b.

When the JIS hardness of the rubber layer located near to the carcass 18 is made larger, strain concentrates in the coating rubber 41 for the carcass 18 (carcass ply 19) and there is feared the occurrence of separation failure in the coating rubber 41. However, when the JIS hardness of the inner rubber layer is made smaller as mentioned above, strain in the coating rubber 41 for the carcass 18 contacting with the restraining rubber 54 can be decreased. Moreover, the other structure and function are the same as in the first embodiment.

Figure 8:
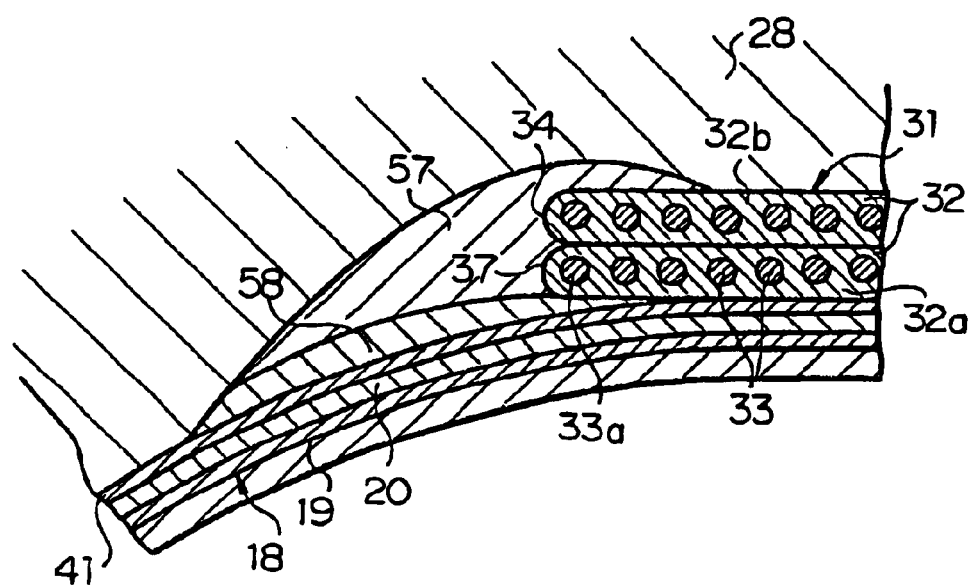
FIG. 8 is a diagrammatically partial enlarged section view illustrating a zone in the neighborhood of a restraining rubber in a seventh embodiment of the pneumatic tire according to the invention.

FIG. 8 shows a seventh embodiment of the invention. In this embodiment, a restraining rubber 57 is made of a rubber material having a JIS hardness of more than 85 degrees. When using such a restraining rubber 57, a large strain is generated in the coating rubber 41 for the carcass 18 (carcass ply 19) contacting with the restraining rubber 57 in the deformation under loading and there is feared the occurrence of separation failure in the coating rubber 41. For this end, a rubber layer 58 having a JIS hardness smaller than that of the coating rubber 41 for the carcass 18 is interposed between the carcass 18 and the restraining rubber 57.

Thus, the above large strain is absorbed by the easily deformable rubber layer 58, whereby strain acting to the coating rubber 41 for the carcass 18 is mitigated to prevent the occurrence of separation failure in the coating rubber 41. Moreover, the other structure and function are the same as in the first embodiment.

The following examples are given in illustration of the invention and are not intended as limitations thereof.

There are provided conventional tires 1 and 2 wherein a JIS hardness of rubber (restraining rubber) arranged outward from a widthwise outer end of a widest-width belt reinforcing layer in the widthwise direction is less than a JIS hardness of a coating rubber for the widest-width belt reinforcing layer, and a comparative tire wherein a JIS hardness of rubber (restraining rubber) arranged outward from a widthwise outer end of a widest-width belt reinforcing layer in the widthwise direction is more than a JIS hardness of a coating rubber for the widest-width belt reinforcing layer but a width L of rubber is less than 4 mm, and example tires 1–19 wherein a JIS hardness of rubber (restraining rubber) arranged outward from a widthwise outer end of a widest-width belt reinforcing layer in the widthwise direction is more than a JIS hardness of a coating rubber for the widest-width belt reinforcing layer but a width L of rubber is not less than 4 mm.

These tires have a tire size of 285/60R22.5. In these tires, an inner belt layer has a width of 160 mm and a cord inclination angle of 52° upward to the right, and an outer belt layer has a width of 140 mm and a cord inclination angle of 52° upward to the left, and inner and outer belt reinforcing layers have a width of 220 mm, respectively.

And also, a JIS hardness of a coating rubber for the widest-width belt reinforcing layer is 70 degrees in the conventional tires 1 and 2, the comparative tire and the tires of Examples 1–3 and 6–19, and 60 degrees in the tires of Examples 4 and 5, and a gauge at the widthwise outer end of the belt reinforcement in these tires is 4 mm. Further, rubber different from the coating rubber for the widest-width belt reinforcing layer is arranged as a restraining rubber in the conventional tires 1 and 2 and the tires of Examples 4–19, while the coating rubber for the widest-width belt reinforcing layer is further extended as a restraining rubber in the comparative tire and the tires of Example 1–3. Only in the tire of Example 19, a rubber layer having a JIS hardness of 56 degrees is arranged between the restraining rubber and the carcass.

The dimensions of these tires are shown in Table 1. In this case, unit of JIS hardness is degree, and unit of each of width L and gauge t is mm. In the tire of Example 17, numerical values of 70 and 76 in the JIS hardness of the restraining rubber correspond to outer and inner rubber layers constituting the restraining rubber. In the tire of Example 18, numerical values of 76 and 70 in the JIS hardness of the restraining rubber correspond to outer and inner rubber layers constituting the restraining rubber.

Then, each of these tires is inflated under an internal pressure of 900 kPa and a load of 49.03 kN is applied to calculate strain in widthwise direction applied to the coating rubber located at the widthwise outer end of the widest-width belt reinforcing layer. The results are shown in Table 1 by an index on the basis that a value of rubber strain in the conventional tire 1 is 100.

Next, each of these tires is assembled onto a rim of 9.00×22.5 and inflated under the above internal pressure and then run on a drum at a speed of 60 km under the above load until separation failure is caused at any position. The results are also shown in Table 1 by an index on the basis that a running distance of the conventional tire 1 is 100.

In Table 1, the position of separation failure cause d in each tire is represented as a trouble position, wherein "end of belt reinforcement" means an occurrence of separation failure in the coating rubber surrounding the reinforcing element located at the widthwise outermost end of the widest-width belt reinforcing layer, and "carcass rubber" means an occurrence of separation failure in the coating rubber for the carcass (carcass ply), and "end of belt layer" means an occurrence of separation failure at a zone Q between the widthwise outer end part of the widest-width belt layer and the belt reinforcement (outer belt reinforcing layer).

TABLE 1

|  | Conventional tire | | Comparative | Example tire | | |
|---|---|---|---|---|---|---|
|  | 1 | 2 | tire | 1 | 2 | 3 |
| JIS hardness of restraining rubber | 56 | 65 | 70 | 70 | 70 | 70 |
| Width L of restraining rubber | 19 | 19 | 2 | 4 | 9 | 19 |
| Gauge t of restraining rubber | 4 | 4 | 4 | 4 | 4 | 4 |
| Form of restraining rubber arranged | FIG. 3 | FIG. 3 | FIG. 2 | FIG. 2 | FIG. 2 | FIG. 2 |
| Rubber arranged at zone Q | cushion rubber | cushion rubber | cushion rubber | cushion rubber | cushion rubber | cushion rubber |
| Rubber strain | 100 | 95 | 94 | 85 | 79 | 75 |
| Running distance | 100 | 103 | 104 | 120 | 125 | 128 |
| Trouble position | end of belt reinforcement | end of belt reinforcement | end of belt reinforcement | end of belt reinforcement | end of belt reinforcement | end of belt reinforcement |

|  | Example tire | | | | | |
|---|---|---|---|---|---|---|
|  | 4 | 5 | 6 | 7 | 8 | 9 |
| JIS hardness of restraining rubber | 62 | 65 | 76 | 85 | 87 | 76 |
| Width L of restraining rubber | 19 | 19 | 19 | 19 | 19 | 19 |
| Gauge t of restraining rubber | 4 | 4 | 4 | 4 | 4 | 2 |
| Form of restraining rubber arranged | FIG. 3 | FIG. 3 | FIG. 3 | FIG. 3 | FIG. 3 | — |
| Rubber arranged at zone Q | cushion rubber | cushion rubber | cushion rubber | cushion rubber | cushion rubber | cushion rubber |
| Rubber strain | 85 | 80 | 70 | 58 | 52 | 70 |
| Running distance | 120 | 124 | 136 | 143 | 117 | 112 |
| Trouble position | end of belt reinforcement | end of belt reinforcement | end of belt reinforcement | end of belt reinforcement | carcass rubber | end of belt reinforcement |

TABLE 2

| | Example tire | | | | | |
|---|---|---|---|---|---|---|
| | 10 | 11 | 12 | 13 | 14 | 15 |
| JIS hardness of restraining rubber | 76 | 85 | 76 | 76 | 80 | 85 |
| Width L of restraining rubber | 19 | 19 | 19 | 19 | 19 | 19 |
| Gauge t of restraining rubber | 6 | 6 | 6 | 6 | 6 | 6 |
| Form of restraining rubber arranged | FIG. 4 | FIG. 4 | FIG. 4 | FIG. 5 | FIG. 5 | FIG. 5 |
| Rubber arranged at zone Q | cushion rubber | cushion rubber | none | restraining rubber | restraining rubber | restraining rubber |
| Rubber strain | 63 | 52 | 63 | 63 | 53 | 63 |
| Running distance | 142 | 152 | 115 | 143 | 147 | 122 |
| Trouble position | end of belt reinforcement | end of belt reinforcement | end of belt layer | end of belt reinforcement | end of belt reinforcement | end of belt layer |

| | Example tire | | | |
|---|---|---|---|---|
| | 16 | 17 | 18 | 19 |
| JIS hardness of restraining rubber | 76 | 70 & 76 | 76 & 70 | 87 |
| Width L of restraining rubber | 19 | 19 | 19 | 19 |
| Gauge t of restraining rubber | 6 | 6 | 6 | 6 |
| Form of restraining rubber arranged | FIG. 6 | FIG. 7 | FIG. 7 | FIG. 8 |
| Rubber arranged at zone Q | cushion rubber | cushion rubber | cushion rubber | cushion rubber |
| Rubber strain | 60 | 78 | 65 | 55 |
| Running distance | 145 | 126 | 140 | 145 |
| Trouble position | end of belt reinforcement | end of belt reinforcement | end of belt reinforcement | end of belt reinforcement |

As mentioned above, according to the invention, the separation failure at the widthwise outer end of the belt reinforcement can effectively be controlled.

What is claimed is:

1. A pneumatic tire comprising
   a carcass toroidally extending between a pair of bead portions,
   a belt arranged on an outside of the carcass in a radial direction and comprised of at least two belt layers containing many reinforcing cords inclined with respect to an equatorial plane of the tire, the cords of which layers being crossed with each other,
   a belt reinforcement arranged on an inside of the belt in the radial direction and comprised of at least one belt reinforcing layer embedded with reinforcing elements extending in a circumferential direction,
   and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and
   a restraining rubber having a JIS hardness not less than a JIS hardness of a coating rubber for the widest-width belt reinforcing layer is arranged outward from the widthwise outer end of the widest-width belt reinforcing layer at least in a direction directly adjacent to the widthwise outer end of the widest-width belt reinforcing layer in an axial direction, wherein:
   the restraining rubber has a width of not less than 4 mm from the widthwise outer end of the widest-width belt reinforcing layer; and
   the restraining rubber is extended inward in the widthwise direction so as to envelop the widthwise outer end part of the belt reinforcement from its outside and inside in the radial direction.

2. A pneumatic tire according to claim 1, wherein the JIS hardness of the restraining rubber is 65–85 degrees.

3. A pneumatic tire according to claim 1, wherein a gauge of the restraining rubber at a boundary between the widthwise outer end of the widest-width belt reinforcing layer and the restraining rubber is made not less than a thickness at the widthwise outer end of the belt reinforcement.

4. A pneumatic tire according to claim 1, wherein the restraining rubber is integrally united with the coating rubber for the belt reinforcing layer.

5. A pneumatic tire according to any one of the claims 1 to 4, wherein when the JIS hardness of the restraining rubber is not less than 65 degrees but not more than 80 degrees, the restraining rubber is passed over an outside of the widthwise outer end part of the belt reinforcement in the radial direction and extended inward in the widthwise direction up to a zone between the belt reinforcement and a widthwise outer end part of a widest-width belt layer.

6. A pneumatic tire according to claim 1 or 2, wherein the restrained rubber is comprised of two or more radially laminated rubber layers having different JIS harnesses, and a JIS hardness of a rubber layer located near to the carcass among the rubber layers becomes smaller than that of the remaining rubber layer.

7. A pneumatic tire according to claim 1, wherein when the JIS hardness of the restraining rubber exceeds 85 degrees, a rubber layer having a JIS hardness smaller than that of a coating rubber for the carcass is interposed between the carcass and the restraining rubber.

8. A pneumatic tire according to claim 1, wherein the width of the restraining rubber is measured at a radial center of a thickness of the widest-width belt reinforcing layer along a direction parallel to the carcass.

9. A pneumatic tire comprising
a carcass toroidally extending between a pair of bead portions,
a belt arranged on an outside of the carcass in a radial direction and comprised of at least two belt layers containing many reinforcing cords inclined with respect to an equatorial plane of the tire, the cords of which layers being crossed with each other,
a belt reinforcement arranged on an inside of the belt in the radial direction and comprised of at least one belt reinforcing layer embedded with reinforcing elements extending in a circumferential direction,
and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and
a restraining rubber having a JIS hardness not less than a JIS hardness of a coating rubber for the widest-width belt reinforcing layer is arranged outward from the widthwise outer end of the widest-width belt reinforcing layer at least in a direction directly adjacent to the widthwise outer end of the widest-width belt reinforcing layer in an axial direction, wherein:
the restraining rubber has a width of not less than 4 mm from the widthwise outer end of the widest-width belt reinforcing layer; and
the restraining rubber is integrally united with the coating rubber for the belt reinforcing layer.

10. A pneumatic tire comprising
a carcass toroidally extending between a pair of bead portions,
a belt arranged on an outside of the carcass in a radial direction and comprised of at least two belt layers containing many reinforcing cords inclined with respect to an equatorial plane of the tire, the cords of which layers being crossed with each other,
a belt reinforcement arranged on an inside of the belt in the radial direction and comprised of at least one belt reinforcing layer embedded with reinforcing elements extending in a circumferential direction,
and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and
a restraining rubber having a JIS hardness not less than a JIS hardness of a coating rubber for the widest-width belt reinforcing layer is arranged outward from the widthwise outer end of the widest-width belt reinforcing layer at least in a direction directly adjacent to the width Wise outer end of the widest-width belt reinforcing layer in an axial direction, wherein:
the restraining rubber has a width of not less than 4 mm from the widthwise outer end of the widest-width belt reinforcing layer and the restraining rubber JIS hardness is not less than 65 degrees but not more than 80 degrees; and
the restraining rubber is passed over an outside of the widthwise outer end part of the belt reinforcement in the radial direction and extended inward in the widthwise direction up to a zone between the belt reinforcement and a widthwise outer end part of a widest-width belt layer.

11. A pneumatic tire comprising
a carcass toroidally extending between a pair of bead portions,
a belt arranged on an outside of the carcass in a radial direction and comprised of at least two belt layers containing many reinforcing cords inclined with respect to an equatorial plane of the tire, the cords of which layers being crossed with each other,
a belt reinforcement arranged on an inside of the belt in the radial direction and comprised of at least one belt reinforcing layer embedded with reinforcing elements extending in a circumferential direction,
and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and
a restraining rubber having a JIS hardness not less than a JIS hardness of a coating rubber for the widest-width belt reinforcing layer is arranged outward from the widthwise outer end of the widest-width belt reinforcing layer at least in a direction directly adjacent to the widthwise outer end of the widest-width belt reinforcing layer in an axial direction, wherein:
the restraining rubber has a width of not less than 4 mm from the widthwise outer end of the widest-width belt reinforcing layer; and
the restrained rubber is comprised of two or more radially laminated rubber layers having different JIS harnesses, and a JIS hardness of a rubber layer located near to the carcass among the rubber layers becomes smaller than that of the remaining rubber layer.

12. A pneumatic tire comprising
a carcass toroidally extending between a pair of bead portions,
a belt arranged on an outside of the carcass in a radial direction and comprised of at least two belt layers containing many reinforcing cords inclined with respect to an equatorial plane of the tire, the cords of which layers being crossed with each other, a belt reinforcement arranged on an inside of the belt in the radial direction and comprised of at least one belt reinforcing layer embedded with reinforcing elements extending in a circumferential direction, and a tread rubber arranged on outsides of the belt and the belt reinforcement in the radial direction, in which a widthwise outer end of a widest-width belt reinforcing layer is arranged outward from a widthwise outer end of a widest-width belt layer among the belt layers, and a restraining rubber having a JIS hardness not less than a JIS hardness of a coating rubber for the widest-width belt reinforcing layer is arranged outward from the widthwise outer end of the widest-width belt reinforcing layer at least in a direction directly adjacent to the widthwise outer end of the widest-width belt reinforcing layer in an axial direction, wherein:

the restraining rubber has a width of not less than 4 mm from the widthwise outer end of the widest-width belt reinforcing layer and the restraining rubber JIS hardness exceeds 85 degrees; and a rubber layer having a JIS hardness smaller than that of a coating rubber for the carcass is interposed between the carcass and the restraining rubber.

* * * * *